United States Patent
Leibman

(10) Patent No.: US 6,241,224 B1
(45) Date of Patent: Jun. 5, 2001

(54) TORSION SPRING

(75) Inventor: Bernard Leibman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/409,694

(22) Filed: Sep. 30, 1999

(51) Int. Cl.⁷ .................... B60G 11/22; F16F 1/48
(52) U.S. Cl. .................... 267/279; 267/189; 267/273; 267/258; 267/276
(58) Field of Search .................... 267/154, 188, 267/189, 201, 257, 258, 275, 276, 273, 25, 26, 279

(56) References Cited

U.S. PATENT DOCUMENTS

| | | | |
|---|---|---|---|
| 2,238,380 | * 4/1941 | Almen | 267/154 |
| 3,019,622 | * 2/1962 | Fermier | 267/154 |
| 3,020,036 | * 2/1962 | Kleinschmidt | 267/154 |
| 3,081,991 | * 3/1963 | Swainson | 267/154 |
| 3,124,342 | * 3/1964 | Ormond | 267/157 |
| 3,272,492 | * 9/1966 | Jones | 267/154 |
| 3,336,021 | * 8/1967 | Kramer | 267/154 |
| 3,831,629 | 8/1974 | Mackal et al. | 137/525 |
| 4,074,958 | 2/1978 | Molenaar | 425/71 |
| 4,127,076 | 11/1978 | Johnson | 112/158 R |
| 4,165,070 | * 8/1979 | Rice | 272/68 |
| 4,602,663 | 7/1986 | Browning, Jr. et al. | 144/213 |
| 4,812,348 | * 3/1989 | Rau | 428/113 |
| 4,812,604 | 3/1989 | Howard | 200/260 |
| 4,953,897 | 9/1990 | Klober | 285/226 |
| 5,209,461 | * 5/1993 | Whightsil | 167/154 |
| 5,257,762 | 11/1993 | Trame et al. | 248/50 |
| 5,289,930 | 3/1994 | Inouye | 215/235 |
| 5,316,355 | 5/1994 | Hartwell et al. | 292/347 |
| 5,515,876 | * 5/1996 | Warner et al. | 134/57 D |
| 6,106,438 | * 8/2000 | Dean | 482/44 |

FOREIGN PATENT DOCUMENTS

| | | | |
|---|---|---|---|
| 479061 | * 9/1991 | (EP) | 267/154 |
| 56-046130 | * 4/1981 | (JP) | 267/154 |

* cited by examiner

Primary Examiner—Robert J Oberleitner
Assistant Examiner—Devon Kramer
(74) Attorney, Agent, or Firm—John M. Kelly; David E. Henn

(57) ABSTRACT

A torsion spring for connecting a first member and a second member that are aligned along a longitudinal axis and that rotate about that axis together. The torsion spring includes a first molded plastic end that mates with the first member, a second molded plastic end that mate with the second member, and an elastic member that connects the first and second molded plastic ends together. The elastic member is for providing a force that biases the second member relative to the first member. The elastic member can be made of molded plastic arms or an elastic compound such as rubber.

20 Claims, 4 Drawing Sheets

TORSION SPRING

FIELD OF THE INVENTION

The present invention relates to torsion springs.

BACKGROUND OF THE INVENTION

The features of the present invention are useful in many machines that use torsion springs. One such machine is an electrophotographic printer. Electrophotographic printing is a well-known and commonly used method of copying or printing documents. Electrophotographic printing is performed by exposing a light image representation of a desired document onto a substantially uniformly charged photoreceptor. In response to that image the photoreceptor discharges so as to create an electrostatic latent image of the desired document on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

Electrophotographic printers are comprised of a large number of individual components, including numerous mechanical devices. One frequently used mechanical device is the torsion spring. Torsion springs are commonly used to bias one element, such as a roller, toward another element, such as a stack of paper.

While torsion springs and their applications are well known, they are typically comprised of multiple parts, such as end caps and a spring steel element, that must be assembled. Such assembly is expensive, time consuming, and often difficult. Therefore, a new type of torsion spring that does not require assembly of individual components would be beneficial.

SUMMARY OF THE INVENTION

The principles of the present invention provide for a new type of torsion spring that does not require assembly of individual components. A torsion spring according to the present invention is useful for joining a first member with a second member along a longitudinal axis, wherein the second member rotates about the axis from a first position to a second position. That torsion spring includes a first molded plastic end for mating with the first member, a second molded plastic end for mating with the second member, and an elastic member that connects the first and said second plastic ends together. The elastic member is designed to provide a force that biases the second member from the second position toward the first position. Beneficially the elastic member is comprised of a plurality of plastic arms that are molded together with the first and second plastic end caps. Alternatively, the elastic member is beneficially comprised of a rubber tubular element.

BRIEF DESCRIPTION OF THE DRAWINGS

The invention will be described in detail herein with reference to the following figures in which like reference numerals denote like elements and wherein.

DETAILED DESCRIPTION OF PREFERRED EMBODIMENTS OF THE INVENTION

While the present invention will be described in connection with preferred embodiments thereof, it will be understood that the present invention is not limited to those embodiments. On the contrary, the present invention is intended to cover all alternatives, modifications, and equivalents as may be included within the spirit and scope of the invention as defined by the appended claims.

Figure 1:
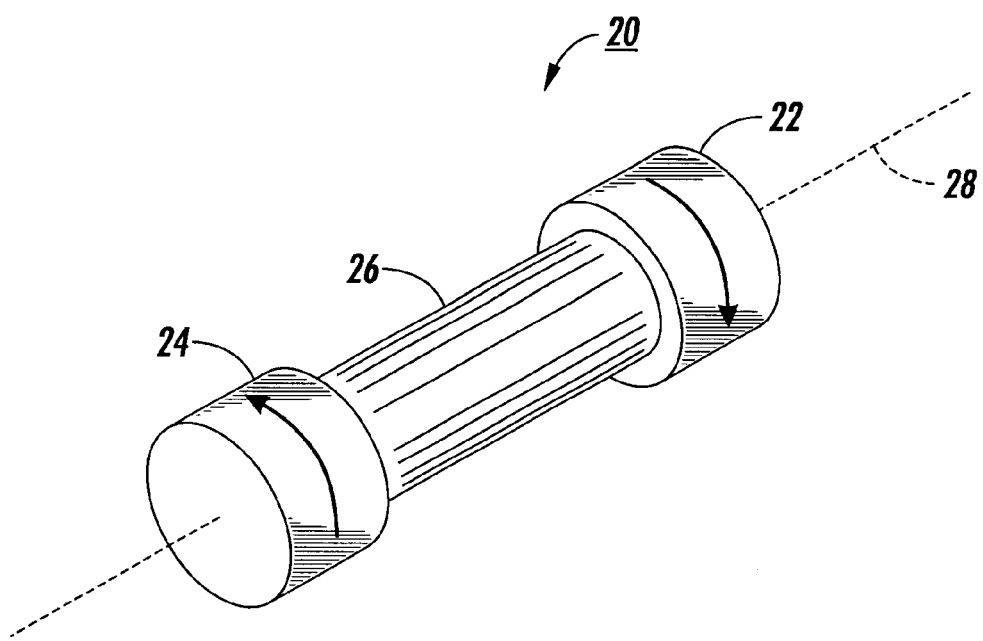
FIG. 1 is a perspective view of a first embodiment of a plastic torsion spring.

FIG. 1 illustrates a first embodiment of a torsion spring 20 according to the principles of the present invention. That spring includes a first molded plastic end 22 that is designed to mate with a first member (not shown in FIG. 1) and a second molded plastic end 24 that is designed to mate with a second member (also not shown in FIG. 1). An elastic tubular member 26 connects the first and said second plastic ends together. Beneficially the elastic tubular member is symmetrical about an axis 28 and has a cross sectional area smaller than the plastic end caps. When either the first and/or the second plastic ends are rotated relative to the other about the axis 28 the elastic tubular member 26 provides a rotational force that attempts to return the plastic ends to a particular relative position about the axis. The amount of restoring force will depend upon the elastic used to make elastic tubular member 26, the length and radius of that member, and the angle of rotation. The elastic tubular member is beneficially made from a rubber compound. The end caps are molded about the elastic tubular member such that the torsion spring is an integral unit.

Figure 2:
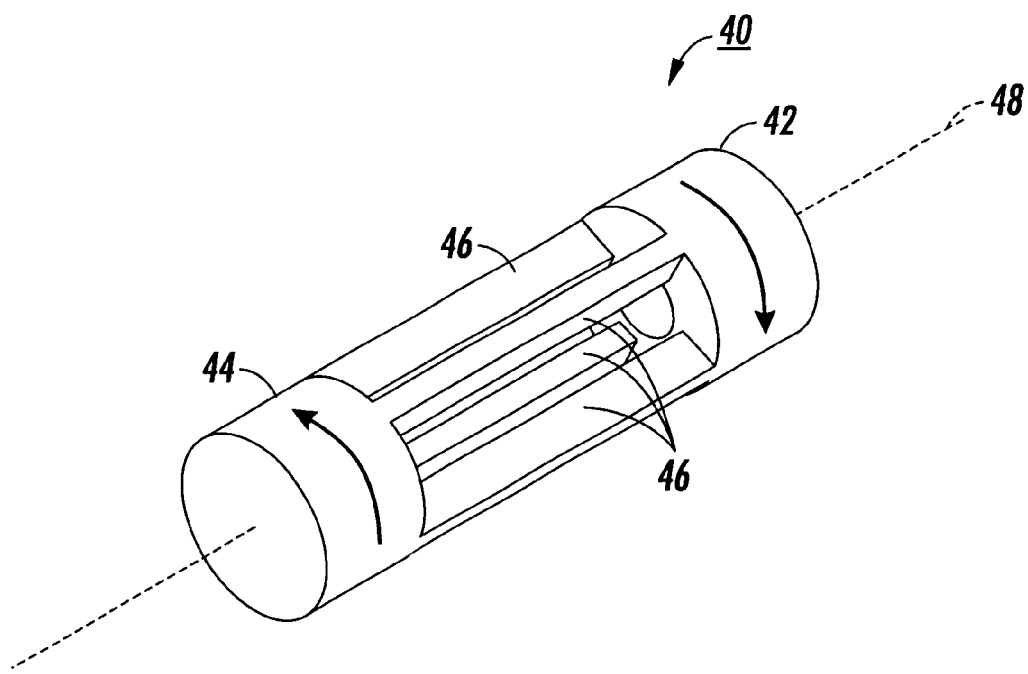
FIG. 2 is a perspective view of a second embodiment of a plastic torsion spring.

FIG. 2 illustrates a second embodiment of a torsion spring 40 according to the principles of the present invention. That spring includes a first molded plastic end 42 that is designed to mate to a first member (not shown in FIG. 2) and a second molded plastic end 44 that is designed to mate with a second member (also not shown in FIG. 2). A plurality of molded plastic arms 46 connect the first and said second plastic ends together. The plastic torsion spring 40 is symmetrical about an axis 48. When either the first and/or the second plastic ends are rotated relative to the other about the axis 48 the plastic arms are twisted. The twisted plastic arms then provide a rotational force that attempts to return the plastic ends to their relative positions about the axis. The amount of restoring force will depend upon the plastic used to make the plastic arms 46, as well as the length and cross-sectional topography of the individual arms. The end caps are molded about the plastic arms such that the torsion spring is an integral unit.

Figure 3:
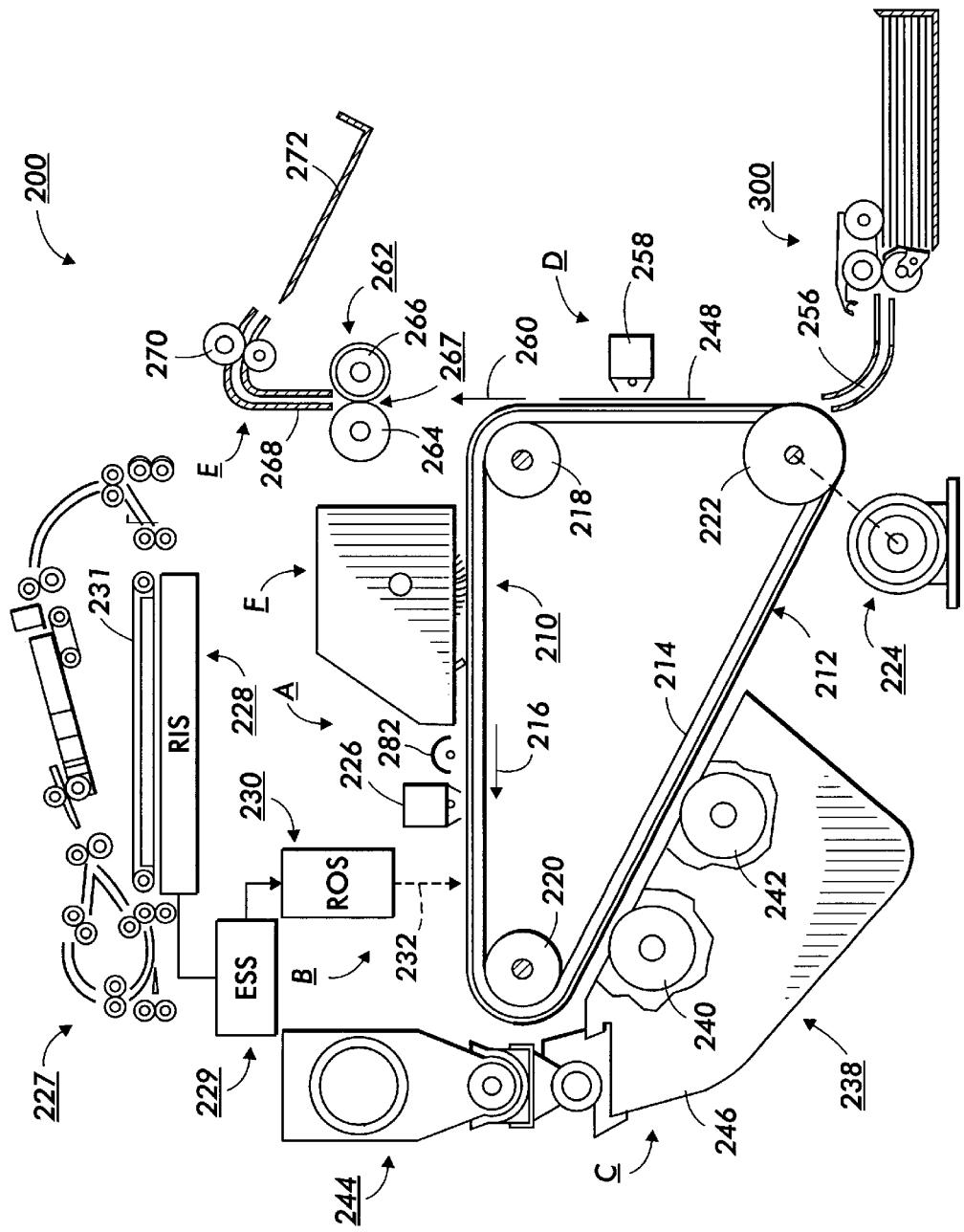
FIG. 3 is a schematic view of an exemplary printing machine suitable for utilizing the plastic torsion springs of FIGS. 1 and 2.

The torsion springs will find use in a number of different applications, including electrophotographic printing machines such as digital copiers. FIG. 3 illustrates a digital copier 200 that is suitable for incorporating the present invention. In operation, an original document is positioned in a document handler 227 of a raster input scanner 228. The raster input scanner contains a document holding platen, document illumination lamps, optics, a mechanical scanning drive, and a charge coupled device (CCD) array. The raster input scanner captures the image on the original document and converts it into a series of raster scan lines. This information is transmitted to an electronic subsystem 229, which also controls a raster output scanner 230 described below. While raster input scanners are well known in the art, for purposes of the present invention it should be noted that such scanners include a cover 231 over a platen. Covers are useful for providing a controlled reflective surface for the area around a document being copied. In operation, covers are lifted off the platen, a document being scanned is placed on the platen, and the cover is then placed over the document. Of course, in many applications documents are automatically feed into position over the platen and under the cover, nonetheless it is useful to provide the capability of manually inserting documents into position. The cover 231 is discussed in its relationship to the present invention subsequently.

The digital copier further includes an electrophotographic printing machine which generally employs a belt 210 having a photoconductive surface 212 deposited on a conductive ground layer 214. The belt 210 moves in the direction 216 so as to advance successive portions of the photoconductive surface 212 sequentially through the various processing stations disposed about the belt. The belt 210 is entrained about a stripping roll 218, a tensioning roll 220, and a drive roll 222. A motor 224 rotates the drive roll 222 such that the belt advances in the direction 216.

Initially, a portion of the belt 210 passes through a charging station A. There a corona generating device 226 charges the photoconductive surface 212 to a relatively high, substantially uniform potential. After the photoconductive surface is charged, the charged portion is advanced through an exposure station B.

At exposure station B the electronic subsystem 229, which beneficially includes a dedicated minicomputer, causes the raster output scanner 230 to produce a modulated laser beam 232. The raster output scanner includes a rotating, multi-faceted polygon mirror and optical systems that sweep the modulated laser beam as a light spot across the photoconductive surface. The sweeping of the laser beam 232 together with the advancement of the belt in the direction 216 cause the charged photoconductive surface to be raster scanned by the modulated laser beam, thereby recording an electrostatic latent image. The electronic subsystem 229 controls the laser beam modulation such that an electrostatic latent image of a desired image is produced.

After being recorded, the electrostatic latent image advances to a development station C. There, toner, in the form of liquid or dry particles, is electrostatically deposited on the electrostatic latent image using well known techniques. Preferably, the development station C uses a magnetic brush developer 238 having magnetic brush developer rolls 240 and 242. Those rolls form a brush of carrier granules and toner particles that extend near the photoconductive surface. The latent image attracts toner particles from the carrier granules, forming a toner powder image. The magnetic brush developer further includes a toner particle dispenser 244 that dispenses toner particles into a developer housing 246 as required.

After the electrostatic latent image is developed, the toner image advances to a transfer station D. Additionally, a substrate 248, such as a sheet of paper, is also advanced to the transfer station D along a paper path 256 via a substrate feeding apparatus 300. The substrate is directed into contact with the photoconductive surface 212. Substrate advancement is timed such that the substrate 248 overlaps the toner powder image as the belt advances. The transfer station D includes a corona generating device 258 that sprays ions onto the back side of the substrate 248. This causes toner to transfer from the photoconductive surface 212 onto the substrate 248. After transfer, the substrate 248 advances in the direction 260 into a fusing station E.

The fusing station E includes a fuser assembly 262 that permanently affixes the transferred toner to the substrate 248. The fuser assembly 262 includes a heated fuser roll 264 and a back-up roll 266 that form a nip 267. The substrate 248 passes between the fuser roll 264 and the back-up roll 266 such that the toner contacts the fuser roll 264. Heat and pressure in the nip permanently affix the toner to the substrate 248. After fusing, the substrate advances through a chute 268 and a drive roll assembly 270 to a catch tray 272 for subsequent removal by the operator.

After the substrate separates from the photoconductive surface 212 there may be residual toner, paper fibers, or other debris remaining on the photoconductive surface 212. Such debris is removed at a cleaning station F. After cleaning a discharge lamp 282 floods the photoconductive surface 212 with light to dissipate any residual electrostatic charges in preparation for the next imaging cycle.

Figure 4:
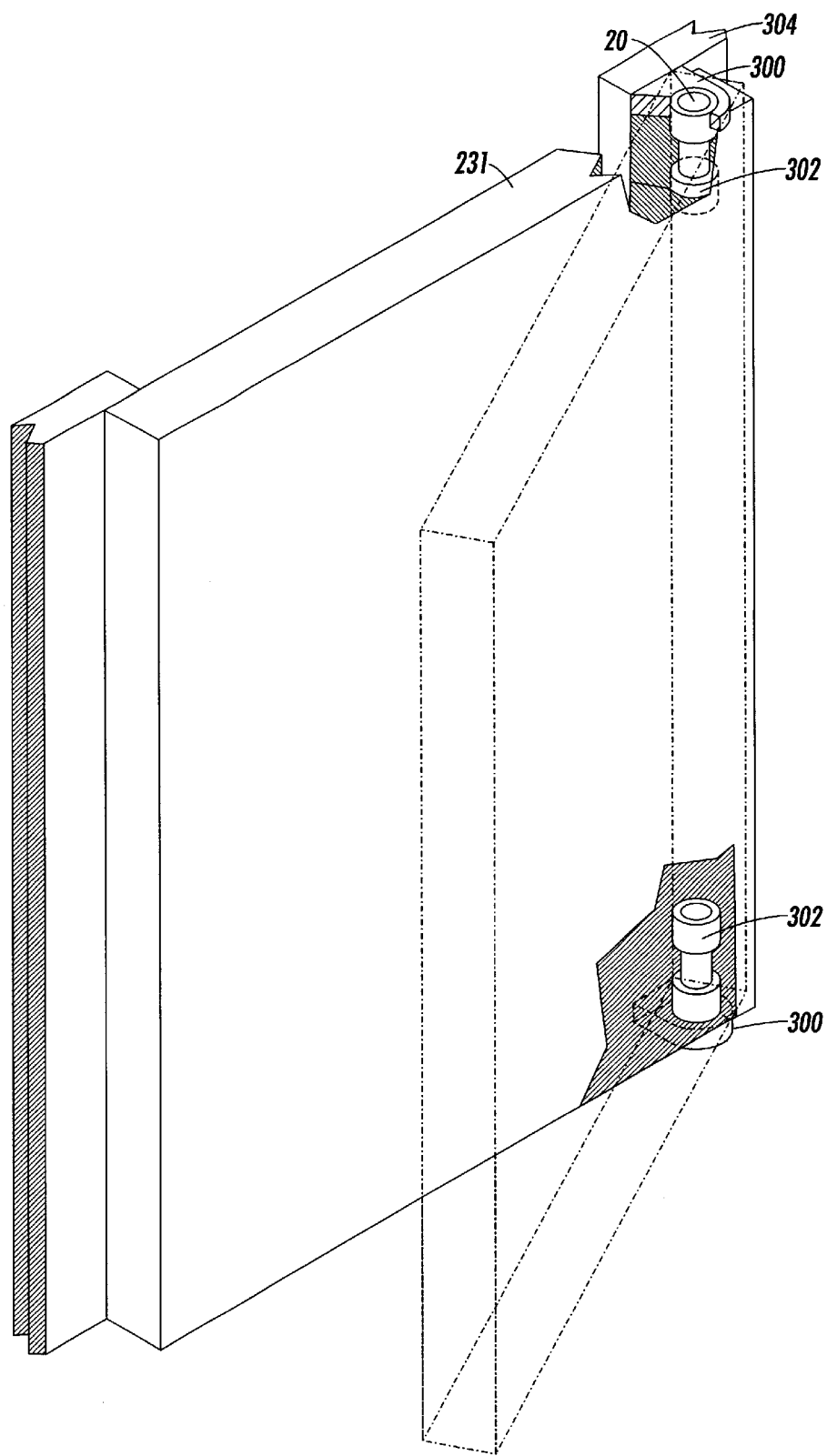
FIG. 4 is a plan view of a plastic torsion spring providing a bias force in the printing machine illustrated in FIG. 3.

It is believed that the foregoing description is sufficient for purposes of the present application to illustrate the general operation of an electrophotographic printing machine suitable for incorporating the present invention. FIG. 4 shows one of many possible applications of the present invention in an electrophotographic printing machine. The cover 231 of FIG. 3 is designed to be raised from a closed position, represented in solid lines in FIG. 4, to an open position, represented by dashed lines in FIG. 4. It is beneficial to have the cover slightly biased downward, that is, back toward the closed position. This bias, together with gravity, ensures that the cover positively closes, thus providing a desirable background to documents on the platen.

As shown in FIG. 4, two plastic torsion springs 20 provide the desired bias. One end of each torsion spring fits into a holder 300 that attaches to the cover 231. The other end of each torsion spring fits into an opening 302 on the machine frame 304. Opening the cover causes the torsion springs to bias the cover back to the closed position.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A torsion spring for connecting a first member and a second member that are aligned along a longitudinal axis, wherein said second member rotates about said longitudinal axis from a first position to a second position, said torsion spring comprising:
   a first molded plastic end adapted to mate with the first member;
   a second molded plastic end adapted to mate with the second member; and
   an elastic member connecting said first molded plastic end with said second molded plastic end, said elastic member for providing a force that biases said second member relative to said first position, the first molded plastic end, the second molded plastic end, and the elastic member being sections of a single molded element.

2. A torsion spring according to claim 1, wherein said elastic member includes a plurality of plastic arms.

3. A torsion spring according to claim 1, wherein said elastic member maintains its elasticity when said second member is in either the first position or the second position.

4. A torsion spring according to claim 1, wherein said elastic member has a cross sectional area smaller than the cross sectional area of said first molded plastic end.

5. A torsion spring according to claim 1, wherein said elastic member has a circular cross section.

6. A torsion spring according to claim 1, wherein said first molded plastic end has a circular cross section.

7. A torsion spring according to claim 1, wherein said elastic member is an integral member.

8. A torsion spring according to claim 7, wherein said elastic member is comprised of a rubber compound.

9. A torsion spring according to claim 7, wherein said elastic member is tubular.

10. A cover assembly for use in a printing machine, comprising:
    a cover moveable between a closed position and an open position, said cover including a spring holder;
    a machine frame having a spring mount; and
    a plastic torsion spring having a first molded plastic end adapted to mate with said spring holder, a second molded plastic end adapted to mate with said spring mount, and an elastic member connecting said first plastic end with said second plastic end, said elastic member for providing a force that biases said cover relative to said machine frame, the first molded plastic end, the second molded plastic end, and the elastic member being sections of a single molded element.

11. A printing machine having a torsion spring for connecting a first member and a second member together along a longitudinal axis thereof, said torsion spring comprising:
    a first molded plastic end adapted to mate with the first member;
    a second molded plastic end adapted to mate with the second member; and
    an elastic member connecting said first molded plastic end with said second molded plastic end, said elastic member for providing a force that biases said second member relative to said first position, the first molded plastic end, the second molded plastic end, and the elastic member being sections of a single molded element.

12. A printing machine according to claim 11, wherein said elastic member includes a plurality of plastic arms.

13. A printing machine according to claim 11, wherein said elastic member maintains its elasticity when said second member is in either the first position or the second position.

14. A printing machine according to claim 11, wherein said elastic member has a cross sectional area smaller than the cross sectional area of said first molded plastic end.

15. A printing machine according to claim 11, wherein said elastic member has a circular cross section.

16. A printing machine according to claim 11, wherein said elastic member is an integral member.

17. A printing machine according to claim 16, wherein said elastic member is comprised of a rubber compound.

18. A printing machine according to claim 16, wherein said elastic member is tubular.

19. A torsion spring for connecting a first member and a second member that are aligned along a longitudinal axis, wherein said second member rotates about said longitudinal axis from a first position to a second position, said torsion spring comprising:
    a first molded plastic end adapted to mate with the first member;
    a second molded plastic end adapted to mate with the second member; and
    an elastic member connecting said first molded plastic end with said second molded plastic end, said elastic member for providing a force that biases said second member relative to said first position and including a plurality of plastic arms, the first molded plastic end, the second molded plastic end, and the plurality of plastic arms being sections of a single molded element.

20. A printing machine having a torsion spring for connecting a first member and a second member together along a longitudinal axis thereof, said torsion spring comprising:
    a first molded plastic end adapted to mate with the first member;
    a second molded plastic end adapted to mate with the second member; and
    an elastic member connecting said first molded plastic end with said second molded plastic end, said elastic member for providing a force that biases said second member relative to said first position and including a plurality of plastic arms, the first molded plastic end, the second molded plastic end, and the plurality of plastic arms being sections of a single molded element.

* * * * *